United States Patent [19]

Matikainen

[11] 4,062,252
[45] Dec. 13, 1977

[54] ROTARY ASSEMBLY AND DRIVE THEREFOR

[75] Inventor: Martti Matikainen, Jyvaskyla, Finland

[73] Assignee: Valmet Oy, Finland

[21] Appl. No.: 586,628

[22] Filed: June 13, 1975

[30] Foreign Application Priority Data

June 19, 1974 Finland ................................. 741886

[51] Int. Cl.² .............................................. F16H 1/28
[52] U.S. Cl. ........................................ 74/801; 74/410; 74/411; 74/792
[58] Field of Search .................. 74/789, 792, 410, 411, 74/801

[56] References Cited

U.S. PATENT DOCUMENTS

| | | | |
|---|---|---|---|
| 1,475,902 | 11/1923 | Thompson | 74/410 |
| 2,027,592 | 1/1936 | Hoffman et al. | 74/410 |
| 2,252,967 | 8/1941 | Forton | 74/801 |
| 2,463,265 | 3/1949 | Graves | 74/792 |
| 2,562,710 | 7/1951 | Gallo et al. | 74/801 |
| 2,591,734 | 4/1952 | Smith et al. | 74/801 |
| 3,011,365 | 12/1961 | Stoeckicht | 74/801 |
| 3,090,258 | 5/1963 | Zink et al. | 74/801 |
| 3,393,584 | 7/1968 | Cleff | 74/801 |
| 3,401,580 | 9/1968 | Sigg | 74/801 |
| 3,424,035 | 1/1969 | Heidrich | 74/801 |

Primary Examiner—C. J. Husar
Attorney, Agent, or Firm—Steinberg & Blake

[57] ABSTRACT

A rotary assembly which has an inner shaft and an outer hollow cylinder coaxially surrounding and freely rotatable with respect to the inner shaft. A drive shaft is coaxial with the inner shaft and is freely rotatable with respect thereto, this drive shaft carrying an inner gear which rotates with the drive shaft. An intermediate gear meshes with the inner gear, and this intermediate gear is mounted directly on the inner shaft for free rotation with respect thereto. A circumferential gear transmission which is coaxial with the inner shaft and the outer cylinder meshes with the intermediate gear and is operatively connected with the cylinder to transmit rotation thereto from the intermediate gear which is driven by way of the inner gear from the rotary drive shaft.

9 Claims, 6 Drawing Figures

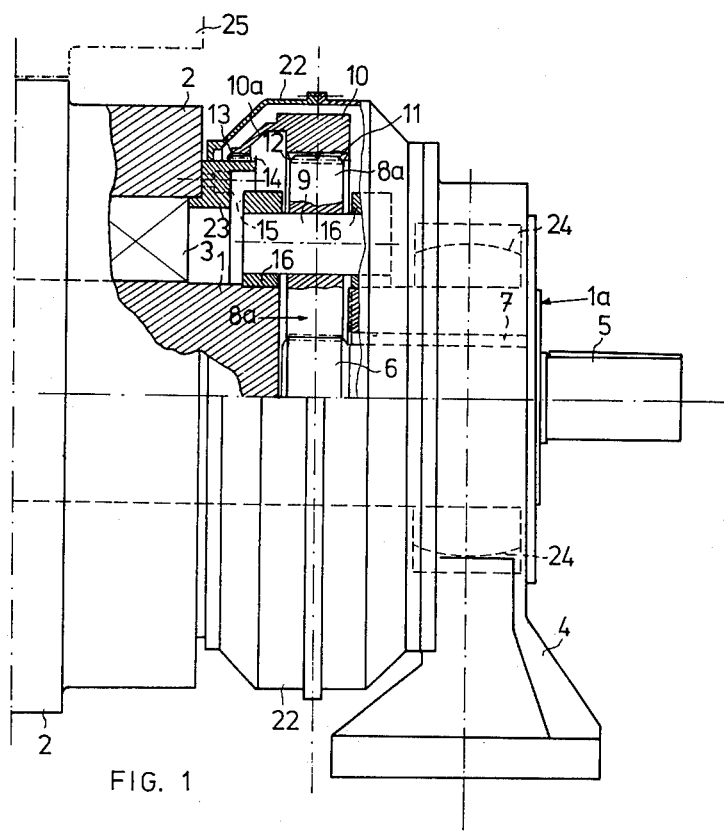
FIG. 1
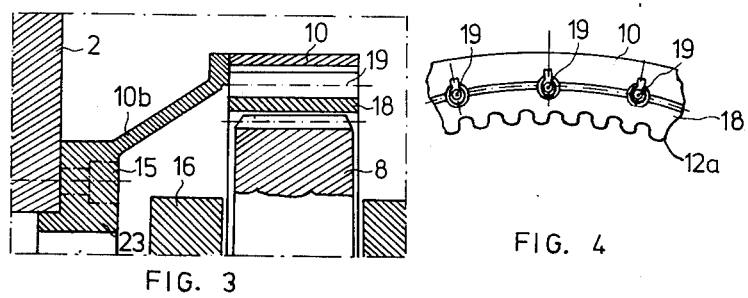
FIG. 3
FIG. 4

ROTARY ASSEMBLY AND DRIVE THEREFOR

BACKGROUND OF THE INVENTION

The present invention relates to rotary assemblies and drives therefor.

In particular, the present invention is applicable to a driving roller construction wherein an outer hollow cylinder which coacts with another roll is capable of being adjusted so as to control the manner in which the pair of rolls cooperate with each other.

Thus, the rotary assembly includes an outer hollow cylinder which surrounds an inner shaft and is rotatable with respect thereto, a suitable drive being transmitted to the outer cylinder from a drive shaft which is coaxial with the inner shaft and the outer cylinder.

While there are known assemblies of the above general type, these known assemblies suffer from several drawbacks. Thus, according to one known construction, a three-ring bearing is provided with two spherical roller bearings, between which a ring is situated so that by way of this ring the rotating transmission can be achieved with suitable connections from the rotary drive shaft to the outer cylinder. Angular displacements between the inner shaft and the outer cylinder are compensated by way of the spherical bearing structure. However, a drive of this type requires an undesirably large radial space so that in order to use such a construction where such space is not available the bearing structure must be reduced to a size smaller than that required, with the result that the bearing structure has an exceedingly small life span.

There is also a known construction where a three-ring bearing assembly is provided, this bearing assembly including one cylindrical and one spherical roller bearing with an interposed ring for transmitting the drive by way of a double-tooth coupling from the rotary drive shaft to the outer cylinder. This double-tooth coupling has curved tooth ends permitting a small extent of angular displacement between the inner shaft and the bearing housing. However, this construction has the same drawbacks as the above construction in that under most operating conditions it is required that the bearing have a size smaller than the required size.

It has also been proposed to provide additional types of drives for constructions of this general type. Thus, according to one construction the power is transmitted along only one transmission path from the drive shaft to the outer hollow cylinder. However, this construction provides only a single location where angular compensation can be made so that the operation of this transmission is undesirably uneven in the event that there is any degree of angular displacement between the outer cylinder and the drive. Furthermore, the transmission of power is faulty in that the teeth of such a transmission are always urged undesirably to one side. In addition, the entire drive mechanism is situated outside of the driven roll so that the space requirements are exceedingly high.

A second type of construction provides a pair of transmission paths from the drive shaft to the outer cylinder, and an attempt is made with such a construction to provide a double angular compensation so as to attempt to distribute the load in a symmetrical manner. However, the drawback of this type of constructions resides in the fact that the equal distribution of the load between both of the power-transmission paths cannot be assured in view of inaccuracies in the manufacture of the components.

It has also been proposed to provide three transmission paths from the rotary drive shaft to the outer cylinder, but this construction also is based upon a double angular compensation and the manner in which the transmission is supported is also inadequate as in the case of the above constructions. Furthermore, the distribution of the load between the three power-transmission paths is not assured in view of the inaccuracies inevitable in the manufacture of the parts.

SUMMARY OF THE INVENTION

It is accordingly a primary object of the present invention to provide a rotary assembly and a drive therefor which will avoid the above drawbacks.

Thus, it is an object of the present invention to provide an assembly of the above type according to which it is possible for angular displacements due to load to be compensated without undesirably influencing the transmission of the drive to the outer cylinder.

Furthermore, it is an object of the present invention to provide a construction according to which the radial space required by the transmission of the invention is exceedingly small so that it becomes possible to situate the structure of the invention in a space where a number of rolls must cooperate with each other.

Furthermore, it is an object of the present invention to provide a construction of the above type where the greater part of the transmission is directly carried by the inner shaft so that there is no relative angular displacement between the inner shaft and the transmission structure carried thereby.

Moreover, it is an object of the present invention to provide a transmission capable of being situated close to the bearing structure which supports the rotary cylinder so that deformation between the rotary cylinder and the inner shaft can be minimized.

Moreover, it is an object of the present invention to provide a construction which requires only angular compensation of the difference between the position on the load of the hollow outer cylinder and the location where the transmission is carried by the inner stationary shaft.

Furthermore, it is an object of the present invention to provide a construction which requires such little radial space that the transmission need not extend outwardly beyond the outer cylinder. Thus, it is an object of the invention to provide a construction of this latter type which makes it possible to utilize the invention in press constructions where it is essential to place closely adjacent to each other a plurality of rolls each of which is capable of having its deflection adjusted.

According to the invention the rotary assembly includes an inner shaft and an outer hollow cylinder surrounding the inner shaft coaxially and being freely rotatable with respect thereto. A rotary drive shaft is situated adjacent an end of the inner shaft and is freely rotable with respect thereto, this rotary drive shaft carrying an inner gear which rotates with the rotary drive shaft. An intermediate gear meshes with the inner gear and is supported by a mounting means which mounts the intermediate gear directly on the inner shaft for free rotation with respect thereto. A plurality of such intermediate gears may be provided with a plurality of mounting means mounting them directly on the inner shaft, so that in this way a transmission in the nature of a planetary gear transmission is provided. The intermediate gears are surrounded by a circumferential gear means which receives the drive therefrom, this circumferential gear means being operatively connected with the outer cylinder to transmit the drive thereto. Thus, this type of construction provides the advantages of situating the transmission close to the bearing which supports the outer cylinder so that deformation between the outer cylinder and the inner shaft is minimized. Furthermore, the entire transmission is carried by the inner shaft so as to be angularly displaceable with the same, thus making it necessary only to compensate for the difference in the position produced under load between the outer cylinder and the location where the transmission is carried by the inner stationary shaft. The space requirements of this construction are exceedingly small and in fact the dimensions of the transmission are smaller than the outer diameter of the outer hollow roll cylinder. These small space requirements enable the drive of the invention to be utilized in press constructions where it is necessary to place closely adjacent to each other a plurality of rolls which are capable of having their deflection adjusted.

BRIEF DESCRIPTION OF DRAWINGS

The invention is illustrated by way of example in the accompanying drawings which form part of this application and in which:

FIG. 1 is a fragmentary partly sectional view of one construction according to the invention shown at the region of an end of an inner shaft and an outer cylinder, FIG. 1 being taken along line I—I of FIG. 2 in the direction of the arrows and showing at its lower portion the left lower part of the structure of FIG. 2 in a side elevation and at its upper portion the right part of FIG. 2 in a partly sectional plan view;

FIG. 3 is a fragmentary axial sectional illustration of a further embodiment of a transmission according to the invention;

FIG. 4 is a fragmentary end view of part of the transmission structure of FIG. 3 as seen from the right of FIG. 3;

DESCRIPTION OF PREFERRED EMBODIMENTS

Figure 6:
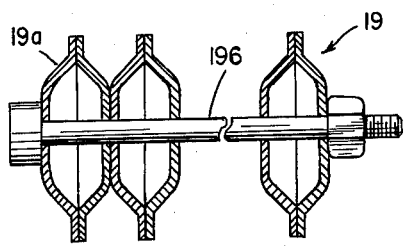
FIG. 6 is a fragmentary partly sectional elevation showing details of a spring means of FIGS. 3 and 4.

The present invention is particularly applicable to rolls which are used in paper manufacturing machines, and in particular rolls which are capable of having their deflection adjusted. Such rolls are known as so-called Kusters rolls and CC rolls. Referring to FIG. 1, the construction of the present invention at the end region such a roll is illustrated. The roll which is capable of having its deflection adjusted includes an outer hollow cylinder 2 and an inner stationary (non-rotating) shaft 1 around which the hollow cylinder 2 is freely rotatable. Thus, the cylinder 2 coaxially surrounds the inner shaft 1 and is supported, for example, by bearings 3 so as to be freely rotatable around the inner shaft 1, this shaft 1 being in the form of a relatively massive structure passing coaxially through the beyond the outer cylinder 2.

Between the inner shaft 1 and the outer cylinder 2 there is a structure for adjusting deflection, this deflection adjusting structure however not being illustrated since it does not form part of the present invention. By means of this deflection-adjusting structure it is possible to control the type of line pressure which obtains between the cylinder 2 and a cooperating, mating roll 25 shown in phantom lines in FIG. 1. Generally, the deflection is adjusted in such a way that there will be a uniform line pressure between the rolls 2 and 25.

The illustrated end 1a of the inner massive stationary shaft 1 is supported by a support means including the robust stand 4 serving to brace the shaft 1 against the frame of the paper machine or the like. The opposite end 1a of the shaft 1, which is not illustrated, is supported in the same way by an identical stand 4. These stands 4, one of which is shown in FIG. 1, accommodate in their interior spherical surface bearing structures 24 which permit the shaft 1 to become angularly displaced at its end regions 1a when it undergoes a deflection under a sufficient load.

Figure 2:
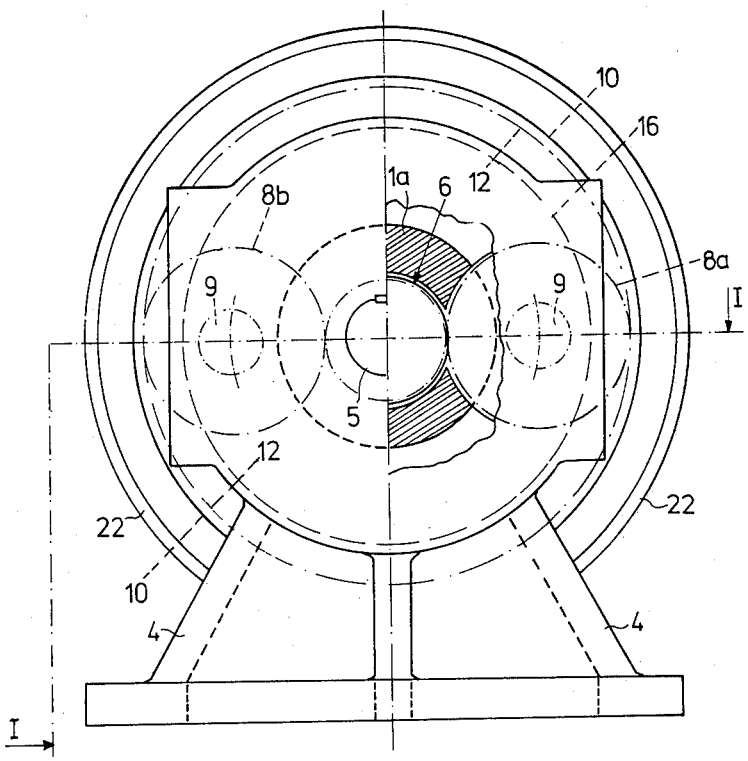
FIG. 2 is an end view of the structure of FIG. 1 as seen from the right of FIG. 1 with part of the structure of FIG. 2 being broken away to illustrate partly in section additional details of the structure.

As is shown in FIGS. 1 and 2, a drive transmission according to the present invention has been provided at the illustrated end regions of the shaft 1 and outer cylinder 2. With this drive of the invention it is possible to transmit a drive from the rotary drive shaft 5 to the outer cylinder 2. The rotary drive shaft 5 is coaxial with the shaft 1 and is freely rotatable with respect thereto, this shaft 5 being driven from an unillustrated drive. The transmission provided in accordance with the present invention is similar to a planetary gear transmission. The end region 1a of the inner shaft 1 is formed with an axial bore 7 which receives in its interior a portion of the rotary drive shaft 5, this shaft 5 fixedly carrying at its inner end an inner gear 6 which is coaxial with the shaft 5, which rotates therewith, and which corresponds to the sun gear of a planetary gear transmission. The teeth of the inner gear 6 mesh with the teeth of a pair of opposed intermediate gears 8a and 8b, these gears 8a and 8b corresponding to planetary gears of a planetary gear transmission. Thus, each of the intermediate gears 8a and 8b has exterior teeth 11 meshing with the inner gear 6.

A mounting means is provided for mounting each of the intermediate gears 8a and 8b directly on the inner shaft 1 for free rotation with respect thereto. Each of these mounting means includes a shaft 9 extending through each gear 8a and 8b. In the illustrated example the mounting means further includes a ring 16 surrounding and fixed to the shaft 1, the ring 16 being formed between its end faces with a pair of slots through and beyond which the gears 8a and 8b extend, and the shafts 9 extend axially across these slots and are carried by the ring 16 so that in this way the mounting means 9, 16 mounts the gears 8a and 8b directly on the inner shaft 1 for free rotation with respect thereto. As is apparent from FIG. 2, the end region 1a of the shaft 1 is itself formed with slots communicating on the one hand with the slots in the ring 16 in which the gears 8a and 8b are accommodated and on the other hand with the bore 7 where the gear 6 is located, so that in this way it is possible for the gears 8a and 8b to mesh directly with the gear 6. The gear 6 is itself supported from the gears 8a and 8b and is freely rotatable within the bore 7 so that the gear 6 can at all times be situated in a plane in which the gears 8a and 8b are located. Thus, no external supporting components or forces are required for the gear 6. If the end region 1a of the shaft 1 should become deflected under load, as permitted by the spherical bearing 24, it will be possible for the gear 6 to remain in the plane which is occupied by the intermediate gears 8a and 8b as the latter move with the shaft 1 during the slight angular deflection which may occur under load.

In addition to the above components the transmission of the invention includes a circumferential gear means 10 which on the one hand meshes with the intermediate gears 8a and 8b and which on the other hand is operatively connected to the cylinder 2 so as to transmit rotation from the intermediate gears to the cylinder 2. According to a further feature of the invention, the circumferential gear means 10 includes at least two circumferential meshing transmissions situated along the train of power transmission from the gears 8a and 8b to the cylinder 2. In the example of FIGS. 1 and 2, the circumferential gear transmission 10 has circumferentially surrounding the intermediate gears 8a and 8b an internal ring gear having teeth 12 which mesh with the teeth 11 of the intermediate gears 8a and 8b, so that one of these circumferential meshing transmissions is formed by the teeth 12 and the ring carrying the same. The ring which carries the teeth 12 has a tapered extension 10a terminating adjacent the end of the cylinder 2 which is visible in FIG. 1 with a second set of internal teeth 13 forming part of the second circumferential meshing transmission, these teeth 13 surrounding and meshing with teeth 14 of a gear 23 fixed directly to the cylinder 2 by way of suitable bolts 15. Thus, the ring gear 23 surrounds the shaft 1 coaxially and has external teeth 14 meshing with the internal teeth 13 to form the second of the circumferential meshing transmissions. It is to be noted that the unit formed by the extension 10a and the pair of end ring gears respectively provided with the internal teeth 12 and 13 forms an annular, rotary floating means which "floats" in the sense that its position with respect to the axis of the shaft 1 is determined only by the cooperation of the teeth 11 with the gears 8a and 8b and the cooperation of the teeth 13 with the teeth 14. Thus, the circumferential gear transmission has two sets of internal teeth 12 and 13 capable of freely assuming a concentric position with respect to the internal components of the transmission, as defined by the intermediate gears 8a and 8b. Thus, with this construction any angular deflection between the axis of the shaft 1 and the axis of the cylinder 2 can be accommodated by the annular rotary floating means on the one hand at the meshing between the teeth 11 of the gears 8a and 8b and the teeth 12 and on the other hand at the meshing between the teeth 13 and 14, so that if angular deflection between the cylinder 2 and the shaft 1 should occur under load, the transmission will still operate in a highly efficient manner. At the same time it will be noted that the entire transmission is exceedingly compact, being located close to the shaft 1 and not being required to extend radially beyond the shaft 1 to such an extent that the transmission of the invention extends outwardly beyond the exterior surface of the cylinder 2. Furthermore, the entire transmission is located close to the cylinder 2 and the structure which supports the shaft 1. The transmission of the invention is accommodated in a suitable housing 22 as illustrated.

In the embodiment of FIGS. 3 and 4, the circumferential gear means 10 is fixed directly to the outer rotary cylinder 2. Thus, as is illustrated in FIG. 3, the tapering portion 10b of the circumferential gear means 10 is fixed at its end ring portion 23 directly to an end of the cylinder 2 by way of the bolts 15. The annular portion 23 of this embodiment is integral with the part 10b which extends from that portion of the circumferential gear means 10 which circumferentially surrounds the pair of intermediate gears 8 one of which is illustrated in FIG. 3. According to this embodiment, the two circumferential meshing transmissions of the circumferential gear means 10 include an inner ring 18 coaxially surrounding the end region 1a of the inner shaft 1 and having inner teeth 12a which mesh with the teeth 11 of the intermediate gears 8. The ring 18 is in turn surrounded by an external ring of the gear transmission 10, this external ring being fixed to and projecting to the right from the portion 10b shown in FIG. 3. These rings are respectively formed with axially extending grooves which register with each other and which receive stacks of substantially cylindrical coupling spring assemblies 19 shown schematically in FIGS. 3 and 4. Thus each pair of registering axially extending grooves of the outer ring 10 and inner ring 18 receives a stack of the cylindrical coupling springs. For example each stack of springs may include (FIG. 6) a series of dished or cup springs 19a situated in end to end relation in a well known manner and formed with central openings through which extends a small tie rod 19b holding the stack of springs together. With such an arrangement, the stacks of springs 19 are capable of transmitting the rotary movement from the intermediate ring 18 to the outer ring 10 which is fixed to the tapered portion 10b of FIG. 3, while at the same time the spring stacks 19 enable the outer ring and the intermediate ring 18 to assume an angular deflection with respect to each other, as required, in order to compensate for possible deflection of the axis of the shaft 1 at its end region 1a, as described above, and when compensating for such deflection the stacks of springs 19 nevertheless will be capable of effectively transmitting the rotary motion.

It will be noted that with the embodiment of FIGS. 3 and 4 although the outer ring of the circumferential gear transmission is fixed directly to the cylinder 2, nevertheless the inner ring 18 forms an annular, rotary floating means which "floats" between the outer ring and the intermediate gears 8 so that the inner ring 18 is free to assume any slight angularly deflected position as called for by the loading conditions of the assembly. Thus by way of the cooperation of the internal teeth of the ring 18 with the intermediate gears 8 and by way of the cooperation of the exterior portion of the ring 18 with the outer ring through the spring stacks 19 a pair of circumferential meshing transmissions are provided to provide efficiently the required transmission of rotary movement while at the same time being capable of compensating for any angular deflection which takes place on the load. The stacks 19 while providing an elastic transmission between the inner and outer circumferential rings nevertheless achieves an effective transmission of rotary motion.

Figure 5:
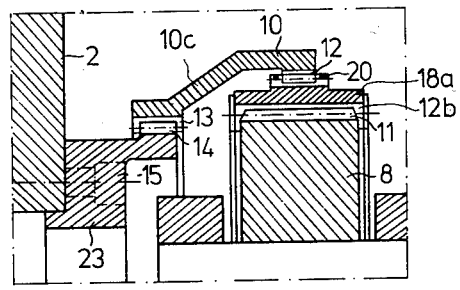
FIG. 5 is a fragmentary axial sectional illustration of a still further embodiment of a construction according to the invention.

With the embodiment illustrated in FIG. 5 there are three circumferential meshing transmissions provided for the outer circumferential gear means 10. Thus it will be seen that the intermediate gears 8 are surrounded by a ring gear 18a having internal teeth 12b meshing with the teeth 11 of the intermediate gears 8. This ring 18a also has external teeth 20 which mesh with the internal teeth 12 of the circumferential ring gear which surrounds the ring 18a, and this same circumferential ring gear has the tapered extension 10c provided at its inner end with the internal teeth 13 meshing with the teeth 14 which are fixed to the ring 23 which in turn is fixed directly to the cylinder 2 by way of the bolts 15. Thus, the cooperation between the teeth 12 and 20 in FIG. 5 corresponds to the cooperation provided by way of the spring stacks 19 of FIGS. 3 and 4, while at the same time the ring 18a cooperates through the teeth 12b with the teeth 11 of the intermediate gears and FIG. 5 has in addition the cooperation between the teeth 13 and 14 included also in the embodiment of FIGS. 1 and 2, so that with this embodiment of the invention it is also possible for an effective transmission of rotary motion to be provided while at the same time accommodation for angular deflection is achieved. It will be noted that with FIG. 5 the ring 18a "floats" between the outer ring 10 and the intermediate gears 8 while at the same time the outer ring 10 itself floats with respect to the ring gear 23 and the ring gear 18a, so that this embodiment includes two annular, rotary floating means.

Thus, in all embodiments of the invention described above the power is transmitted from the rotary drive shaft 5 to the cylinder 2 by way of a train of transmission elements which include the shaft 5, the inner gear 6 which is similar to the sun gear of a planetary transmission, the intermediate gears 8, similar to the planetary gears of such a transmission, and the circumferential gear means 10 which may take any of the various forms described above.

It is to be noted, however, that the invention is not confined to all of the details described above and shown in the drawings. For example, any desired number of intermediate gears 8 may be provided. Instead of the two gears illustrated it is possible to provide three of four intermediate gears. In addition, the separate ring 16 which forms together with the shafts 9 the mounting means for the intermediate gears may be replaced, for example, by any extension fixed or integral with the shaft 1 and projecting radially therefrom to carry the ends of the shafts 9.

What is claimed is:

1. In a rotary assembly, an inner shaft having an end region, an outer cylinder coaxially surrounding and freely turnable with respect to said inner shaft, support means supporting said inner shaft at said end region thereof for angular deflection with respect to said cylinder when the latter is loaded sufficiently, a drive shaft coaxial with said inner shaft and outer cylinder, said drive shaft being freely rotatable with respect to said inner shaft, an inner gear fixed coaxially to said drive shaft for rotation therewith, an intermediate gear meshing with said inner gear, mounting means carried by said inner shaft and mounting said intermediate gear for rotary movement with respect to said inner shaft about an axis parallel thereto, and circumferential gear means coaxial with said inner shaft and outer cylinder and meshing with said intermediate gear so that rotation of said drive shaft is transmitted through said inner gear and intermediate gear to said circumferential gear means, said circumferential gear means being operatively connected with said outer cylinder for rotating the latter with respect to said inner shaft, whereby a drive from said drive shaft is transmitted to said outer cylinder through said inner gear, intermediate gear, and circumferential gear means, said circumferential gear means including at least two circumferential meshing transmissions for transmitting the drive from said intermediate gear to said outer cylinder, one of said circumferential meshing transmissions cooperating with said intermediate gear and the other being situated along a train of transmission between said intermediate gear and said outer cylinder, and said circumferential gear means including in said train of transmission an annular, rotary floating means for accommodating said circumferential gear means to any angular deflection between said inner shaft and said outer cylinder.

2. The combination of claim 1 and wherein said one circumferential meshing transmission includes an internal ring gear meshing with said intermediate gear, and said other circumferential meshing transmission including an internal ring gear fixed coaxially to and rotatable with the internal ring gear of said one circumferential meshing transmission, and said other circumferential meshing transmission including a gear fixed coaxially to said outer cylinder and surrounded by and meshing with said internal ring gear of said other circumferential meshing transmission, said annular, rotary floating means interconnecting and carrying both of said internal ring gears.

3. The combination of claim 1 and wherein said one circumferential meshing transmission includes a ring forming said rotary floating means and having internal teeth meshing with said intermediate gear, and said other circumferential meshing transmission surrounding said ring and cooperating therewith for transmitting the drive therefrom to said outer cylinder.

4. The combination of claim 3 and wherein said other circumferential meshing transmission includes an outer ring surrounding said ring which meshes with said intermediate gear, both of said rings being formed with registering recesses directed toward each other and extending parallel to the axis of said inner shaft, and stacks of substantially cylindrical coupling springs each extending into a pair of registering recesses across a gap between said rings for providing said other circumferential meshing transmission.

5. The combination of claim 3 and wherein said other circumferential meshing transmission includes an outer ring coaxially surrounding said ring which meshes with said intermediate gear, and said rings respectively carrying teeth which mesh with each other.

6. The combination of claim 5 and wherein a gear is fixed to said outer cylinder for rotation therewith and said outer ring surrounding the latter gear and having an additional set of internal teeth meshing therewith, said outer ring forming a second annular, rotary floating means.

7. The combination of claim 1 and wherein said circumferential gear means is situated adjacent an end of said outer cylinder and has an outer diameter which is no greater than the outer diameter of said cylinder.

8. The combination of claim 1 and wherein said inner shaft is formed at said end region with an axial bore accommodating part of said rotary drive shaft and said inner gear, said inner shaft being formed with a slot communicating with said bore and into which said intermediate gear extends to mesh with said inner gear, said mounting means including a shaft extending through said intermediate gear and means mounting said shaft which extends through said intermediate gear directly on said inner shaft and maintaining said shaft which extends through said intermediate gear at all times at a predetermined location with respect to said inner shaft, said circumferential gear means surrounding said inner shaft at said end region thereof.

9. The combination of claim 1 and wherein a plurality of said intermediate gears mesh with said inner gear and cooperate with said circumferential gear means while said mounting means mounts said plurality of intermediate gears on said inner shaft for free rotation with respect thereto, whereby a transmission similar to a planetary transmission is provided between said drive shaft and said cylinder.

* * * * *